United States Patent [19]
Magrini

[11] Patent Number: 6,082,503
[45] Date of Patent: Jul. 4, 2000

[54] CLAMPING DEVICE

[75] Inventor: Sergio Magrini, Modena, Italy

[73] Assignee: New Holland North America, Inc., New Holland, Pa.

[21] Appl. No.: 09/081,503

[22] Filed: May 20, 1998

[30] Foreign Application Priority Data

May 27, 1997 [IT] Italy .................................. T097A0450

[51] Int. Cl.[7] ................................................ B65H 59/10
[52] U.S. Cl. .............................. 188/67; 74/493; 292/305; 403/374.3
[58] Field of Search .................................. 188/67, 68, 69, 188/72.7; 403/374.3, 110; 280/775; 74/493, 531; 292/305, 306, 256, 256.75

[56] References Cited

U.S. PATENT DOCUMENTS

| | | | |
|---|---|---|---|
| 567,193 | 9/1896 | Nash ........................................ | 292/306 |
| 4,240,305 | 12/1980 | Denaldi ..................................... | 74/493 |
| 4,265,562 | 5/1981 | Seel ......................................... | 292/306 |
| 4,387,926 | 6/1983 | Van Eerden et al. ..................... | 188/67 |
| 5,199,319 | 4/1993 | Fujiu ........................................ | 74/493 |
| 5,265,492 | 11/1993 | Snell ........................................ | 74/531 |
| 5,928,290 | 7/1999 | Grammas ................................. | 292/306 |

FOREIGN PATENT DOCUMENTS 0368700   5/1990   European Pat. Off. .

*Primary Examiner*—Robert J. Oberleitner
*Assistant Examiner*—Thomas J. Williams
*Attorney, Agent, or Firm*—Larry W. Miller; J. William Stader; Frank A. Seemar

[57] ABSTRACT

A clamping device is disclosed for attachment to two elements in order to clamp the two elements in any desired relative position. The clamping device comprising a rod for attachment to one element and a collar for attachment to the other element and having an aperture through which the rod passes with clearance. A locking member mounted on the collar at a position spaced from the aperture along the axis of the rod is adjustable manually to apply a force between the collar and the rod in a direction to cause the collar to tilt relative to the rod, so as to jam the rod in the aperture.

5 Claims, 3 Drawing Sheets

CLAMPING DEVICE

BACKGROUND OF THE INVENTION

The present invention relates to a clamping device for attachment to two elements that are movable relative to one another in order to clamp the two elements in any desired relative position. The clamping device is particularly intended for use with an adjustable vehicle steering wheel to enable it to be locked at any rake angle that is comfortable for the vehicle driver.

It is known to provide a universal joint in a steering column to allow the upper part of the steering column to be pivoted relative to its lower part, thereby allowing the rake or tilt of the steering wheel to be adjusted for driver comfort. The casing in which the two parts of the steering column are journalled is formed in two parts that can pivot relative to one another and that are clamped firmly in one position after the steering wheel has been moved into a comfortable position. The clamping device of the present invention is intended for such an application though it may be used in other situations where it is desired to clamp relatively movable elements, in order to maintain them a fixed distance apart.

The conventional manner of locking a tilt steering wheel is to provide a U-shaped bracket that hangs beneath the vehicle dashboard or is otherwise attached to the vehicle body, the two arms of the bracket straddling the upper part of the steering column. A clamping device on the bracket serves to prevent the steering column from moving inside the bracket.

Various clamping devices are known, for example from U.S. Pat. Nos. 5,265,492, 5,199,319 and EP-A-0.368.700 that use a handle pivoted on the bracket. Rotation of the handle in one direction locks the steering wheel while rotation of the handle in the opposite direction releases the steering wheel to allow it to be moved to a new position. Because a high clamping force is needed to prevent the steering column from tilting after it has been set in its desired position, it is necessary to use a long and obtrusive handle.

U.S. Pat. No. 4,240,305 uses a screw on a split collar to grip the steering column. Here, considerable effort is required to tighten the screw in order to grip the steering wheel sufficiently firmly to prevent it from moving inadvertently. Releasing the screw to readjust the position of the steering wheel after a time can prove even more difficult.

SUMMARY OF THE INVENTION

With a view to mitigating the foregoing disadvantages, there is provided in accordance with the present invention, a clamping device for attachment to two elements in order to clamp the two elements in any desired relative position, the clamping device comprising a rod for attachment to one of the elements, a collar for attachment to the other element and having an aperture through which the rod passes with clearance and a locking member mounted at a position along the axis of the rod spaced from the aperture and adjustable manually to apply a force between the collar and the rod in a direction to cause the collar to tilt relative to the rod, so as to jam the rod within the aperture.

The forces applied to a steering wheel during use act predominantly downwards and it is these forces that the clamping device must withstand to prevent the position of the steering wheel changing unintentionally during normal steering of the vehicle. In the present invention, the locking member is not required to apply a sufficiently high frictional force between the collar and the rod to prevent the rod from sliding inside the collar when a downward force is applied to the steering wheel. Instead the locking member acts to tilt the collar, until the rod is jammed in the aperture by making contact with the collar on opposite sides of the upper and lower edges of the aperture.

If the rod should try to move relative to the aperture in the direction corresponding to a downward force being applied to the steering wheel, then the friction between the collar and the rod will act in the direction to make the collar tilt still further and grip the rod even more tightly. The frictional force created by the locking member need therefore only be sufficiently high to resist the lesser forces acting upwards on the steering wheel.

The locking member is preferably a screw threaded into the collar at right angles to the rod and having a knob that may be manually gripped.

When the locking member is released, if the rod is to be allowed to move freely relative to the collar, then it is necessary to ensure that the collar will return to a position in which the aperture and the rod are coaxial.

In a preferred embodiment of the invention, a sleeve is slidably mounted on the rod and is urged by a spring towards the collar, the collar and the sleeve having complementary conically tapered axial end surfaces that interact with one another under the action of the spring to align the aperture in the collar with the axis of the rod.

Conveniently, the rod, the spring and the collar are formed as a preassembled unit, the rod being fitted with a stop, such as a circlip, to prevent the collar from sliding off the rod.

The spring may conveniently comprise a helical spring acting between a shoulder on the sleeve and a pivot pin by means of which the rod is attached to one of the two elements. In this case, the spring assists in supporting the weight of the steering wheel and column when the clamping device is released and returns the steering column to an upper position.

The spring urging the sleeve towards the collar may additionally or alternatively comprise spring clips secured to the collar and resiliently engaging a surface of the sleeve.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
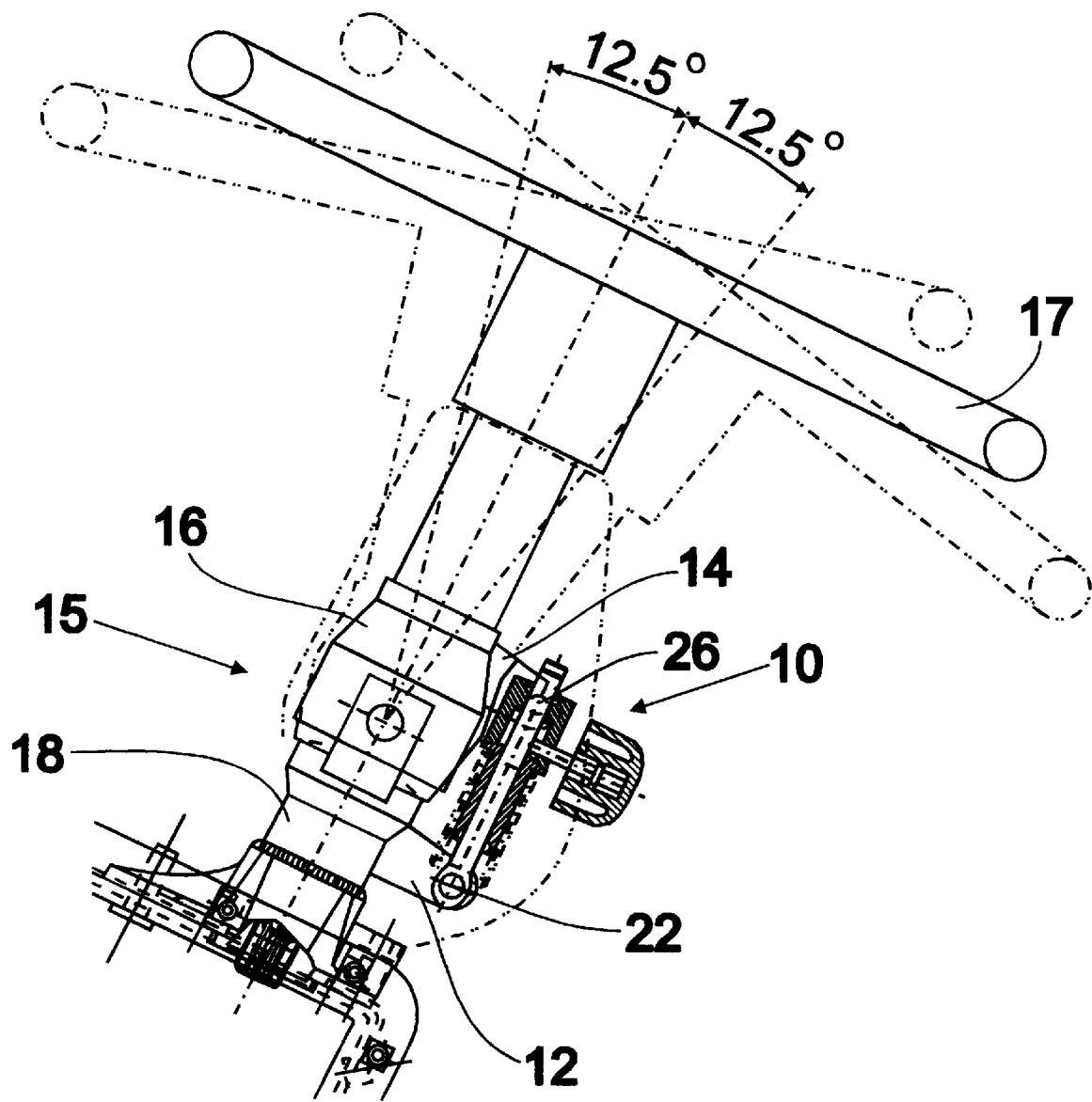
FIG. 1 is a schematic representation of a steering column fitted with a clamping device of the present invention.

The clamping device 10 in the drawings is connected between two brackets 12 and 14 projecting radially from two elements that are pivotable relative to one another in the plane of the drawing and that are to be clamped relative to one another. The clamping device 10 is shown in FIG. 1 connected to two parts 16 and 18 of a tractor steering column that are separated from one another by a universal joint 15. The upper part 16 of the column carries a steering wheel 17 and the lower part 18 is connected to the remainder of the steering system, which in the case of a tractor comprises a hydraulic steering valve (not shown). The universal joint 15 allows the adjustment of the rake of the steering wheel 17 by 12.5 to each side of a central position, as shown in dotted lines in FIG. 1.

Figure 2:
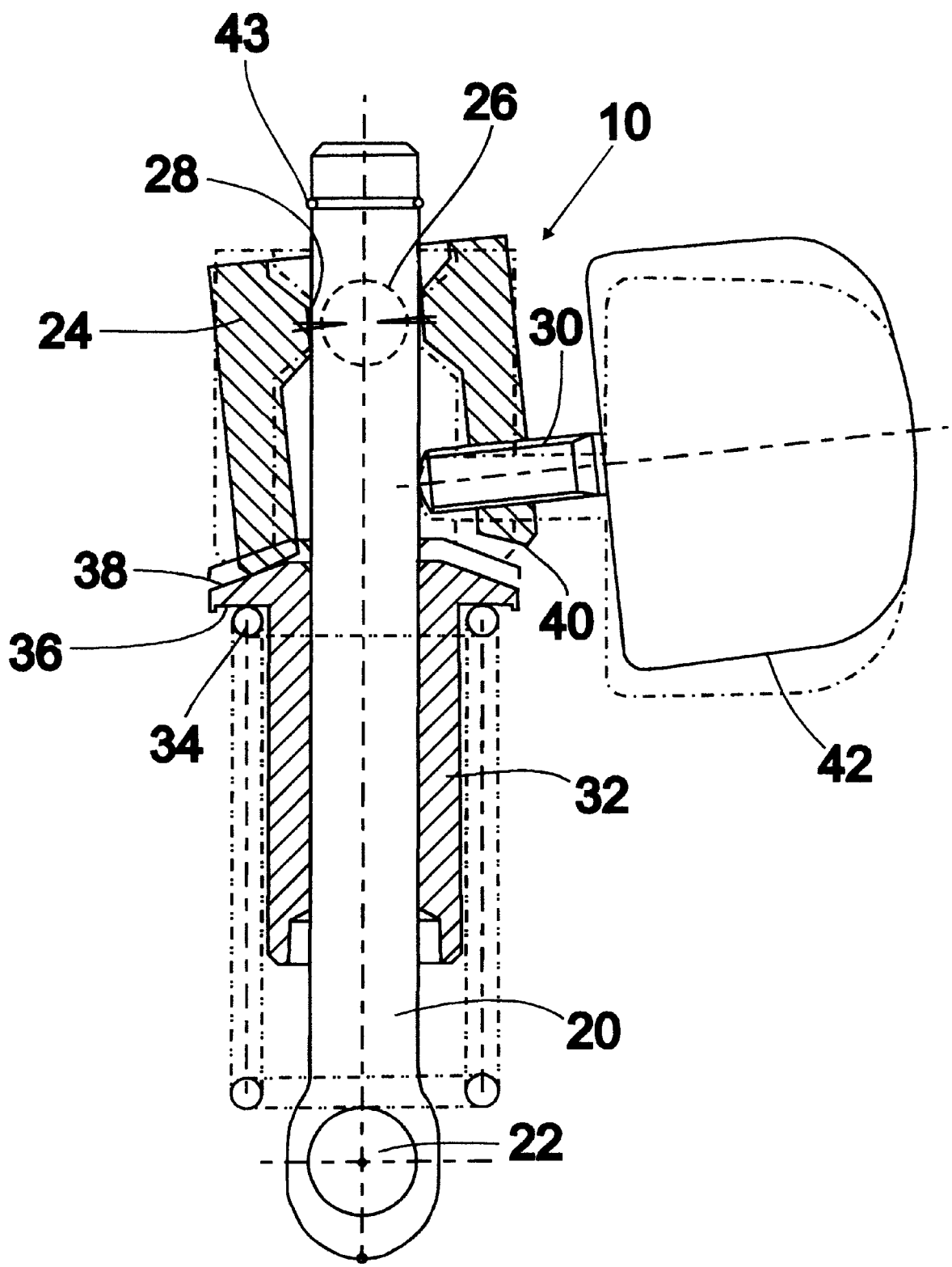
FIG. 2 is a schematic section through the clamping device shown in FIG. 1, being shown in its clamping position in solid lines and in its released position in dotted lines.

The clamping device 10, as more clearly shown in FIG. 2, comprises a rod 20 that is pivotable about a pin 22 relative to the bracket 12 and a collar 24 pivotable about a pin 26 relative to the bracket 14. The rod 20 passes with clearance through an aperture 28 in the collar 24 which lies along the collar 24 level with the pivot pin 26. A locking screw 30 is screwed into the collar 24 at a distance from the pivot pin 26 and abuts the rod 20. When the screw 30 is tightened by manually turning a knob 42, it causes the collar 24 to rotate counter-clockwise as viewed about the pin 26.

A sleeve 32 is slidable along the rod 20 and is urged towards the collar 24 by a helical spring 34 that acts between the pivot pin 22 and an external shoulder 36 on the sleeve 32. The facing axial end surfaces 38 and 40 on the sleeve 32 and the collar 24, respectively, are conically tapered so that the sleeve 32 applies a force to the collar 24 in a direction to render it coaxial with the rod 20. A circlip 43 fitted in a groove in the rod 20 serves to keep the collar 24 on the rod 20 before it is mounted on the brackets 12 and 14. The circlip 43 further represents a stop member for the collar 24 when the steering column is urged to its extreme upper position. Downward pivotal movement of the steering column is limited by the sleeve 32 abutting the pin 22.

In the released position of the clamping device 10 shown in FIG. 1 and in dotted lines in FIG. 2, the collar 24 is coaxial with the rod 20 on account of the mating between the conical end surfaces on the collar 24 and the sleeve 32. In this position, the rod 20 passes through the aperture 24 with clearance and the collar 24 can freely slide over the rod 20. Consequently, the distance between the pivot pins 22 and 26 can be adjusted at will and the clamping device 10 does not resist relative movement of the elements 16 and 18. When the knob 42 is released, the helical spring 34 is operable to counteract the weight of the steering column, which is pushed up all the way towards its extreme upper position if not stopped earlier manually.

Once the desired position of the elements 16 and 18 is reached, the knob 42 on the screw 30 is turned manually until the collar 24 is pivoted about the pin 26 into the position shown in FIG. 2. In this position, the rod 20 is jammed between the opposite edges of the aperture 28, which is case hardened. When there is sufficient frictional force between the rod 20 and the edges of the aperture 28 of the collar 24 to resist separation of the pivot pins 22 and 26, then the clamping device has been tightened to the extent necessary. As a result of the leverage effect of the locking screw 30, there is no need to apply a great deal of torque to the knob 42 of the locking screw 30 and the clamping device 10 can consequently be locked quickly and with little effort.

In this position of the collar 24, it is capable of resisting very large forces acting to bring the pivot pins 22 and 26 closer together. This is because the friction between the collar 24 and the rod 20 acts to turn the collar 24 counter-clockwise, as viewed, thereby further jamming the rod 20 in the aperture. The greater the effort to slide the collar 24 along the rod 20 to the left, as viewed, the more the rod 20 will become jammed in the aperture 28 and the greater will be its resistance to movement.

When it is again required to adjust the steering column, the knob 42 of the locking screw 30 can be slackened with little effort. As it is unscrewed, the sleeve 32 will act to return the collar 24 to the coaxial position with the rod, in which a clearance is again created between the rod 20 and the aperture 28 to allow the collar 24 to slide freely along the rod 20.

In case the locking screw 30 is released only partially, then still some friction will exist on the one hand between the collar 24 and the rod 20 and on the other hand between the locking screw 30 and the rod 20. As a result, the pushing force of the spring 34 partially is dissipated and the steering column will return to its extreme upper position more gently, allowing a more comfortable positioning by an operator as, under these circumstances, it is no longer required to retain the steering column manually during adjustment.

Figure 3:
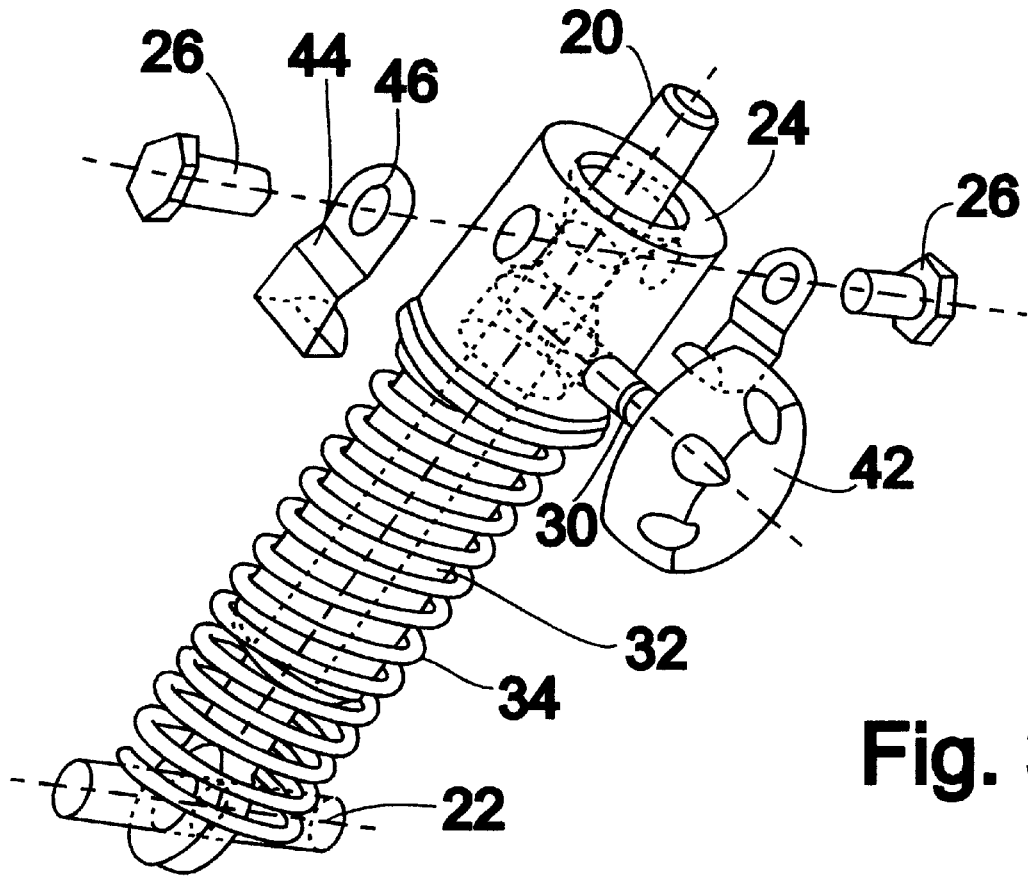
FIG. 3 is a perspective view of a second embodiment of a clamping device in accordance with the invention.

The perspective view of FIG. 3 shows a clamping device that in addition to all the components described above includes a pair of spring clips 44 that are attached to the collar 24. In particular, the spring clips 44 have apertures 46 through which pass the bolts 26 that mount the collar 24 on the bracket 14 to define the pivot axis of the collar 14. The spring clips 44 are bent over at their opposite end and engage the shoulder 36 on the sleeve 32 to urge the sleeve 32 against the collar 24. The spring clips serve to urge the sleeve 32 into contact with the collar 24. This simplifies assembly as the two components 24 and 23 can be slipped over the rod 20 at the same time without the collar jamming on the rod 20 as a result of unintentional misalignment.

Figure 4:
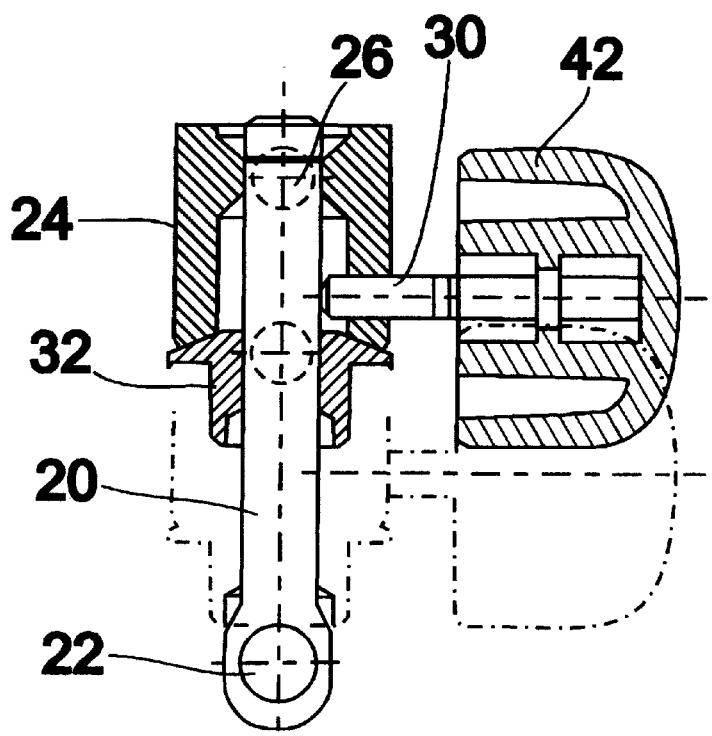
FIG. 4 is a schematic section through a clamping device of a further embodiment of the invention.

If the spring clips 44 are present, it is possible to dispense with the helical spring 34 as is the case in the embodiment shown in FIG. 4. Such an embodiment can be made considerably smaller than the embodiment of FIGS. 1 and 2 but has the disadvantage that the weight of the steering column is not supported by the spring 34 and the operator is required to take the weight of the steering column until the clamping device 10 is tightened.

The clamping device 10 may thus rely exclusively on a helical spring 34, as shown in the embodiment of FIGS. 1 and 2, it may rely exclusively on spring clips 44, as described by reference to the embodiment of FIG. 4, or it may include both a helical spring 34 and spring clips 44 as shown in the embodiment of FIG. 3.

It will be clear that various modifications may be made to the described embodiment without departing from the scope of the invention as set out in the appended claims. For example, it is not essential to use a screw as a locking member for pivoting the collar 24 relative to the rod 20, and it would be possible instead to use a handle to rotate an eccentric acting between the rod 20 and the collar 24. Furthermore, in place of a spring biased sleeve 32, other suitable means may be used for urging the collar 24 back into a coaxial position when the locking device is released. For example, a rubber bush or radial springs may be fitted between the rod and the collar.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A clamping device for attachment to two elements in order to clamp the two elements in any desired relative position, the clamping device comprising a rod for attachment to one of the elements, a collar for attachment to the other element and having an aperture through which the rod passes with clearance and a locking member mounted at a position along the axis of the rod spaced from the aperture and adjustable manually to apply a force between the collar and the rod in a direction to cause the collar to tilt relative to the rod, so as to jam the rod within the aperture, said locking member being a screw threaded into the collar at right angles to the rod and having a knob that may be manually gripped.

2. The clamping device as claimed in claim 1, wherein a sleeve is slidably mounted on the rod and is urged axially by a spring towards the collar, the collar and the sleeve having complementary conically tapered axial end surfaces that interact with one another under the action of the spring to align the aperture in the collar with the axis of the rod.

3. The clamping device as claimed in claim 2, wherein the spring acts between a shoulder on the sleeve and a pivot pin by means of which the rod is attached to one of the two elements.

4. The clamping device as claimed in claim 3, wherein the spring comprises spring clips secured to the collar and resiliently engaging a surface of the sleeve.

5. The clamping device as claimed in claim 3, the rod, the sleeve, the spring and the collar are formed as a pre-assembled unit, the rod being fitted with a stop to prevent the collar from sliding off the rod.

* * * * *